US012046196B2

(12) United States Patent
Jiang et al.

(10) Patent No.: US 12,046,196 B2
(45) Date of Patent: Jul. 23, 2024

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Kaiyun Jiang, Hubei (CN); Yuan Wu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 71 days.

(21) Appl. No.: 17/795,539

(22) PCT Filed: Apr. 13, 2022

(86) PCT No.: PCT/CN2022/086487
§ 371 (c)(1),
(2) Date: Jul. 27, 2022

(87) PCT Pub. No.: WO2023/173518
PCT Pub. Date: Sep. 21, 2023

(65) Prior Publication Data

US 2023/0335053 A1 Oct. 19, 2023

(30) Foreign Application Priority Data

Mar. 18, 2022 (CN) ......................... 202210272198.3

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0842* (2013.01);
(Continued)

(58) Field of Classification Search
CPC ..... G09G 2300/0842; G09G 2310/061; G09G 2320/0247; G09G 3/3233; G09G 3/3266;
(Continued)

(56) References Cited

U.S. PATENT DOCUMENTS 7,401,918 B2 * 7/2008 Howell .................. G02C 11/10 351/158
7,806,525 B2 * 10/2010 Howell .................. G02C 11/10 351/158
(Continued)

FOREIGN PATENT DOCUMENTS

CN 104538003 A 4/2015
CN 105096838 A 11/2015
(Continued)

OTHER PUBLICATIONS

International Search Report in International application No. PCT/CN2022/086487,mailed on Nov. 28, 2022.
(Continued)

*Primary Examiner* — Ricardo Osorio
(74) *Attorney, Agent, or Firm* — Rivka Friedman

(57) ABSTRACT

The present disclosure provides a display panel and a display device, including a plurality of control lines and pixel drive circuits electrically connected to the plurality of control lines to be loaded with a plurality of control signals, wherein a difference value between a maximum value and a minimum value of each of the plurality of control signals is determined as a voltage difference value, each of the plurality of pixel drive circuits includes a drive transistor and a light emitting element electrically connected to each other,
(Continued)

and for at least one control signal of the plurality of control signals, the voltage difference value corresponding to a larger second refresh rate is different from the voltage difference value corresponding to the smaller first refresh rate in the display panel.

20 Claims, 4 Drawing Sheets

(52) U.S. Cl.
CPC ................. *G09G 2310/061* (2013.01); *G09G 2320/0247* (2013.01); *G09G 2330/021* (2013.01)

(58) Field of Classification Search
CPC ..... G09G 2330/021; G09G 2300/0819; G09G 2300/0861; G09G 2310/0262; G09G 2310/08; G09G 2340/0435; G09G 3/3208; G09G 5/393
See application file for complete search history.

(56) References Cited

U.S. PATENT DOCUMENTS

| | | | | |
|---|---|---|---|---|
| 9,129,295 | B2 * | 9/2015 | Border | G02B 5/23 |
| 11,107,411 | B1 * | 8/2021 | Zhang | G09G 3/3258 |
| 2013/0002641 | A1 | 1/2013 | Kim | |
| 2014/0063054 | A1 * | 3/2014 | Osterhout | G06T 19/006 345/633 |
| 2014/0146394 | A1 * | 5/2014 | Tout | G02B 26/10 359/630 |
| 2014/0159995 | A1 * | 6/2014 | Adams | G02C 5/16 351/113 |
| 2014/0160055 | A1 * | 6/2014 | Margolis | G06F 1/1684 345/173 |
| 2015/0261015 | A1 * | 9/2015 | Han | G02C 9/04 351/158 |
| 2016/0109713 | A1 * | 4/2016 | Osterhout | G02B 27/0172 359/630 |
| 2017/0229091 | A1 * | 8/2017 | Chung | G09G 5/003 |
| 2018/0090073 | A1 * | 3/2018 | Lee | G09G 3/3258 |
| 2019/0057646 | A1 * | 2/2019 | Lin | G09G 3/3225 |
| 2019/0206355 | A1 | 7/2019 | Morii | |
| 2021/0327347 | A1 * | 10/2021 | Xu | G09G 3/3233 |

FOREIGN PATENT DOCUMENTS

| | | | | | |
|---|---|---|---|---|---|
| CN | 105654890 | A | | 6/2016 | |
| CN | 106875891 | A | | 6/2017 | |
| CN | 111341258 | A | | 6/2020 | |
| CN | 111640390 | A | | 9/2020 | |
| CN | 111696473 | A | | 9/2020 | |
| CN | 112489599 | A | | 3/2021 | |
| CN | 112542123 | A | * | 3/2021 | G09G 3/20 |
| CN | 113178157 | A | | 7/2021 | |
| CN | 113380180 | A | | 9/2021 | |
| CN | 113593481 | A | | 11/2021 | |
| CN | 115424559 | A | * | 12/2022 | |
| TW | 202209281 | A | * | 3/2022 | G09G 3/3233 |
| WO | WO-2021175172 | A1 | * | 9/2021 | G09G 3/20 |

OTHER PUBLICATIONS

Written Opinion of the International Search Authority in International application No. PCT/CN2022/086487, mailed on Nov. 28, 2022.
Chinese Office Action issued in corresponding Chinese Patent Application No. 202210272198.3 dated Dec. 8, 2022, pp. 1-15.

* cited by examiner

DISPLAY PANEL AND DISPLAY DEVICE

TECHNICAL FIELD

The present disclosure relates to a display technical field, in particular, to a technical field of manufacturing a display panel, and in particular, to a display panel and a display device.

BACKGROUND

OLED (organic light emitting diode) display device has advantages of light weight, thin thickness, flexibility, wide viewing angle range, and the like.

In a pixel drive circuit of an existing OLED display, the current to flow through the OLED is controlled by a drive transistor, to control the light emission of the OLED. However, a gate of the drive transistor has different voltage drops for different refresh rate values. That is, when the refresh frequency of the OLED display is changed, the current flowing through the OLED is changed, and the image brightness presented on the OLED display is changed. Thus, a screen flicker phenomenon occurs, and the image display quality of the OLED display is reduced.

Therefore, the existing OLED display has a screen flicker phenomenon when the refresh rate value is changed, and an improvement is urgently needed.

Technical Problems

The present disclosure provides a display panel and a display device to solve a technical problem of a screen flicker phenomenon due to a change in a voltage drop at a gate of a drive transistor when a refresh rate value of the existing OLED display is changed in the embodiments.

Technical Solutions

An embodiment of the present disclosure provides a display panel, the pixel drive circuit including:

- a plurality of control lines configured to be loaded with a plurality of control signals, wherein a difference value between a maximum value and a minimum value of each of the control signals is determined as a voltage difference value;
- a plurality of pixel drive circuits, wherein each of the plurality of pixel drive circuits is electrically connected to more than one of the control lines, and wherein each of the pixel drive circuits includes a drive transistor and a light emitting element electrically connected to the drive transistor;
- wherein the display panel has a plurality of refresh rates, the plurality of refresh rates including a first refresh rate and a second refresh rate greater than the first refresh rate, and wherein for at least one of the control signals, the voltage difference value corresponding to the second refresh rate is different from the voltage difference value corresponding to the first refresh rate.

Beneficial Effects

The present disclosure provides a display panel and a display device, the display panel including: a plurality of control lines configured to be loaded with a plurality of control signals, wherein a difference value between a maximum value and a minimum value of each of the control signal is determined as a voltage difference value; a plurality of pixel drive circuits, wherein each of the plurality of pixel drive circuits electrically connected to more than one of the control lines, wherein each of the pixel drive circuits includes a drive transistor and a light emitting element electrically connected to the drive transistor; wherein the display panel has a plurality of refresh rates, the plurality of refresh rates include a first refresh rate and a second refresh rate greater than the first refresh rate, and wherein for at least one of the control signals, the voltage difference value corresponding to the second refresh rate is different from the voltage difference value corresponding to the first refresh rate. In the present disclosure, the voltage difference value corresponding to the larger second refresh rate is controlled to be different from the voltage difference value corresponding to the smaller first refresh rate, that is, the minimum value of each of the control signals is compensated according to the value of the refresh rate, so as to increase or decrease a voltage value of a gate voltage of the drive transistor at a start point of the light emitting element, so as to reduce a difference between total voltage drops ΔV1 of the gate voltages of the drive transistor T1 due to the switching of the refresh rates, thereby reducing the screen flicker phenomenon due to the presence of larger total voltage drops ΔV1.

BRIEF DESCRIPTION OF THE DRAWINGS

The present disclosure is further described below with reference to the accompanying drawings. It should be noted that the accompanying drawings in the following description are merely intended to illustrate some embodiments of the present disclosure, and other drawings may be obtained from these accompanying drawings by those skilled in the art without creative efforts.

EMBODIMENTS OF THE PRESENT DISCLOSURE

Technical solutions in embodiments of the present disclosure will now be clearly and completely described in conjunction with the accompanying drawings in the embodiments of the present disclosure. It will be apparent that the described embodiments are only some but not all of the embodiments of the present disclosure. All other embodiments obtained by those skilled in the art without creative efforts based on the embodiments of the present disclosure are within the scope of the present disclosure.

The terms "first", "second", "third", etc. in the present disclosure are used to distinguish different objects, rather than to describe a specific order. The terms "include(s)", "have," as well as any variations thereof, are intended to cover non-exclusive inclusions. For example, a process, method, system, product, or device that includes a series of steps or modules is not limited to the listed steps or modules, but alternatively further includes steps or modules that are not listed, or alternatively further includes other steps or modules inherent to these processes, methods, products, or devices.

References to "embodiments" herein mean that specific features, structures, or features described in connection with the embodiments may be included in at least one embodiment of the present disclosure. The presence of this phrase at various locations in the specification does not necessarily mean the same embodiment, nor is it an independent or alternative embodiment that is mutually exclusive with other embodiments. Those skilled in the art explicitly and implicitly understand that the embodiments described herein may be combined with other embodiments.

Embodiments of the present disclosure provide a display panel including, but not limited to, the following embodiments and combinations thereof.

In one embodiment, the display panel includes: a plurality of control lines configured to be loaded with a plurality of control signals, wherein a difference value between a maximum value and a minimum value of each of the control signals is determined as a voltage difference value; and a plurality of pixel drive circuits, wherein each of the plurality of pixel drive circuits is electrically connected to more than one of the control lines. Refer to, but not limited to, FIG. 1, each of the pixel drive circuits includes a drive transistor T1, and a light emitting element Di electrically connected to the drive transistor. The display panel has a plurality of refresh rates, and the plurality of refresh rates include a first refresh rate and a second refresh rate greater than the first refresh rate. For at least one of the control signals, the voltage difference value corresponding to the second refresh rate is different from the voltage difference value corresponding to the first refresh rate.

Figure 1:
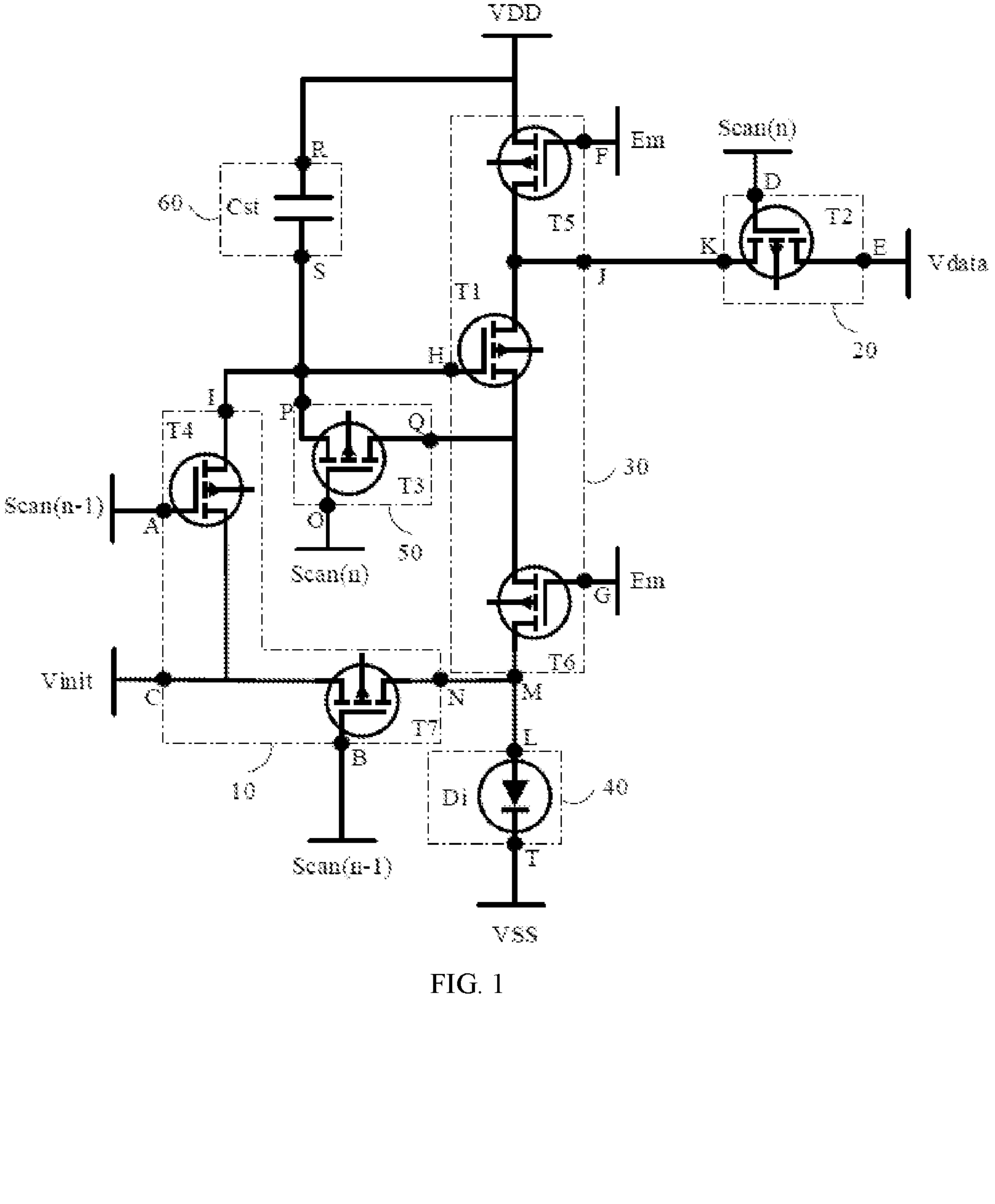
FIG. 1 is a circuit diagram of a pixel drive circuit according to an embodiment of the present disclosure.
Figure 2:
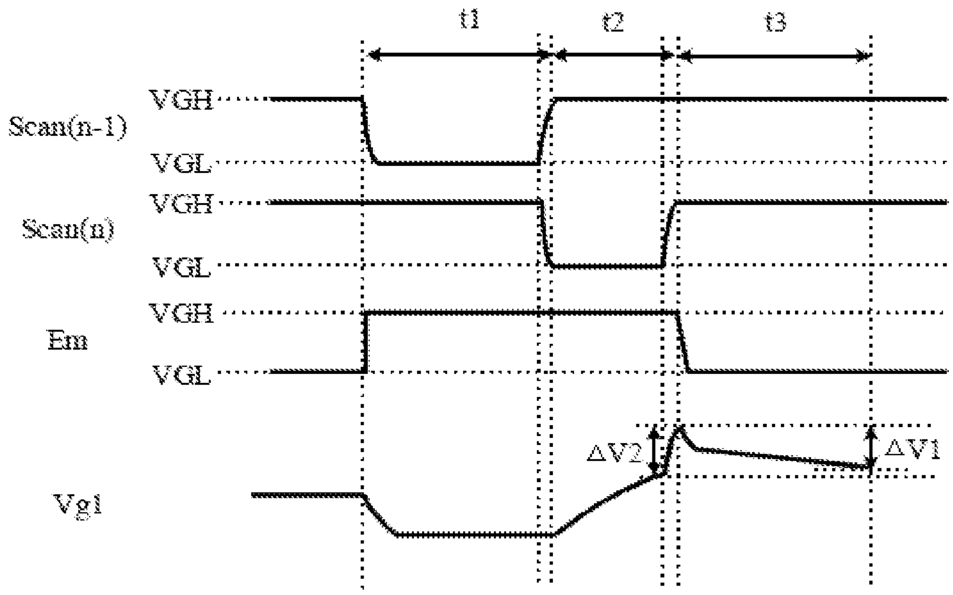
FIG. 2 is a timing diagram of a pixel drive circuit according to an embodiment of the present disclosure.

It may be understood that because at least a capacitor generated due to routing line coupling (such as a capacitor formed between the control lines and a gate of the drive transistor T1, as shown in FIGS. 1 and 2) appears in the circuit, a gate voltage Vg1 of the drive transistor T1 rapidly rises in a short period prior to a light emitting stage t3 of the light emitting element Di, and then drops rapidly in an early stage in the light-emitting stage t3 back to a value, which approaches the value before the gate voltage Vg1 of the drive transistor T1 is rapidly rised. The "fast rised" value of the gate voltage Vg1, ΔV2, may be considered to be equivalent to (VGH−VGL)×(Cst/Call), wherein Cst and Call may be taken as a storage capacitance in the pixel drive circuit and the sum of other capacitances except for the storage capacitance, respectively, and VGH may be understood as the maximum value of the above-mentioned control signal and generally as a preset value. Therefore, when Cst and Call are not taken into consideration, it may be understood that the above "fast rised" value ΔV2 is related to both the minimum value VGL and the maximum value VGH of the control signal.

It should be noted that, since each of the pixel drive circuits is electrically connected to a plurality of control lines, and the light emitting element Di in each of the driving circuits is electrically connected to a corresponding drive transistor T1, control signals applied to the control lines may control the current flowing through the drive transistor T1 and the voltage across the drive transistor T1, thereby controlling the light emitting of the light emitting element Di. It can be understood that, when the refresh rate of the display panel is switched to perform the screen display, the durations of the light emitting stages t3 of the light emitting element Di corresponding to the different refresh rates at the same grayscale value are different. Thus, voltage drops at a specific position in the drive transistor T1 are different. In particular, as shown in FIGS. 1 and 2, after the gate voltage Vg1 of the drive transistor T1 rises rapidly ΔV2 in a short period prior to the light emitting stage t3 of the light emitting element Di, the gate voltage Vg1 rapidly drops at a start point of the light emitting stage t3 to produce a voltage drop. In addition, due to for example, different durations of the light emitting stages t3 of the drive transistor T1, different voltage drops by which the gate voltages Vg1 of the drive transistor T1 drop rapidly at the start times of the light emitting stages t3 are different. Therefore, the total voltage drops ΔV1 in the light emitting stages t3 are different from each other, which results in a change in the light emitting brightness of the light emitting element Di, and shows as a screen flicker phenomenon.

Based on the above, in this embodiment, for at least one of the control signals, the voltage difference value (VGH−VGL) corresponding to the second refresh rate is set to be different from the voltage difference value (VGH−VGL) corresponding to the first refresh rate. In connection with the above description, the voltage difference value (VGH−VGL) corresponding to the second refresh rate is adjusted with respect to the first refresh rate, and the above "fast rised" value ΔV2 of the gate voltage Vg1 changes the gate voltage Vg1 of the drive transistor T1 at the start time of the light emitting phase T3. It can be understood that by appropriately setting the voltage difference value (VGH−VGL) corresponding to the second refresh rate and the voltage difference value (VGH−VGL) corresponding to the first refresh rate, the gate voltage Vg1 of the drive transistor T1 varies little in the total voltage drops ΔV1 in the light emitting phase T3 for different refresh rates, which provides a direction for reducing the screen flicker phenomenon due to the larger total voltage drop ΔV1.

Further, for at least one of the control signals, the voltage difference value (VGH−VGL) corresponding to the second refresh rate is greater than the voltage difference value (VGH−VGL) corresponding to the first refresh rate. In particular, in connection with the above description, the above "fast rised" value ΔV2 of the gate voltage Vg1 is equivalent to (VGH−VGL)×Cst/Call. In this embodiment, the voltage difference value (VGH−VGL) corresponding to the second refresh rate is greater than the voltage difference value (VGH−VGL) corresponding to the first refresh rate. That is, for the smaller first refresh rate, the corresponding voltage difference value (VGH−VGL) is set to be smaller, so that the "fast rised" value ΔV2 of the gate voltage Vg1 is reduced and thus the gate voltage Vg1 of the drive transistor T1 is reduced at the start time of the light emitting stage t3, thereby avoiding the total voltage drop ΔV1 of the gate voltage Vg1 of the drive transistor T1 in the light emitting stage t3 from being excessively large. In this case, the difference value between the total voltage drops ΔV1 of the gate voltages Vg1 of the drive transistor T1 in the light emitting stage t3 is reduced during the refresh rates are switched, to reduce the screen flicker phenomenon due to the larger total pressure drop ΔV1.

In one embodiment, for at least one of the control signals, a minimum value of the control signal corresponding to the second refresh rate is less than a minimum value of the control signal corresponding to the first refresh rate. Further, it can be understood that a first refresh frequency group consists of at least the first refresh rate and the second refresh rate. That is, the minimum value VGL of each of the control signals is at least negatively correlated with the refresh rate in the first refresh frequency group. In connection with the above description, in this embodiment, the minimum value VGL of each of the control signals is set to be negatively correlated at least with the refresh rate in the first refresh frequency group. That is, for the plurality of refresh rate in the first refresh frequency group, the minimum value VGL of each of the control signals is negatively correlated with the refresh rate, and a compensation is performed for the minimum value VGL of each of the control signals according to the refresh rate in the first refresh frequency group. As can be understood, in the case where the grayscale values are identical to each other, and when a larger refresh rate, for example, is switched to a smaller refresh rate, it can be seen from FIGS. 2 and 3 that when the duration of the light emitting stage t3 of the drive transistor T1 is increased, the voltage drop of the gate voltage Vg1 of the drive transistor T1 is increased in the light emitting stage t3. In the contrast, in the present embodiment, for a smaller refresh rate, the minimum value VGL of each of the control signals is set to be larger, so that the “fast rised” value ΔV2 of the gate voltage Vg1 is reduced and thus the gate voltage Vg1 of the drive transistor T1 is reduced at the start time of the light emitting stage t3, thereby avoiding the total voltage drop ΔV1 of the gate voltage Vg1 of the drive transistor T1 in the light emitting stage t3 from being excessively large. In this case, the difference value between the total voltage drops ΔV1 of the gate voltages Vg1 of the drive transistor T1 in the light emitting stage t3 is reduced during the refresh rates are switched, so as to improve the screen flicker phenomenon due to the larger total pressure drop ΔV1.

In one embodiment, the display panel includes a plurality of pixel drive circuits, each of the pixel drives includes a drive transistor T1 and a light emitting element Di electrically connected to the drive transistor T1. At least for respective of the refresh rates in a first refresh frequency group, the gate voltages of the drive transistor have the same change amount in a light emitting stages of the light emitting element. It is understood that, in connection with the above description, the light emitting durations of the light emitting element Di for different refresh rates are different, so that the total voltage drops ΔV1 in the gate voltages Vg1 of the drive transistor T1 in the light emitting phases T3 are different, which results in a change in the light emitting brightness of the light emitting element Di, and presents a screen flicker phenomenon. Based on the above, in this embodiment, for respective of the refresh rates in the first refresh frequency group, the gate voltages Vg1 of the drive transistor T1 have the same change amount in the light emitting stages of the light emitting element Di(that is, the total voltage drop ΔV1 of the gate voltage Vg1 of the drive transistor T1 in the light emitting phase t3). Therefore, the luminous brightness of the light emitting element Di tends to be almost same when the refresh rate is changed, and the screen flicker phenomenon is eliminated.

In particular, in connection with the above description, provided is, but not be limited to be, an implement in which the minimum value VGL of each of the control signals is at least negatively correlated with the refresh rate in the first refresh frequency group. That is, the display panel further includes a plurality of control lines configured to be loaded with a plurality of control signals, and each of the pixel drive circuits is electrically connected to more than one of the control lines, wherein a minimum value VGL of each of the control signals may be set to at least be negatively correlated with the refresh rate in the first refresh frequency group. Further, the control signal is disposed to have the appropriate minimum values VGLs respectively for respective refresh rates in the first refresh frequency group, to achieve “at least for respective refresh rates in a first refresh frequency group, the gate voltages of the drive transistor have the same change amount in a light emitting stages of the light emitting element”. Moreover, from the design that “ΔV2 is equivalent to (VGH−VGL)×Cst/Call”, it can be seen that by further providing an appropriate VGH, “for respective of the refresh rates in the first refresh frequency group, the gate voltages Vg1 of the drive transistor T1 have the same change amount in the light emitting stages of the light emitting element Di” is achieved.

In one embodiment, as shown in FIGS. 1 and 2, the plurality of control lines include plural stages of gate lines and light emitting control lines. A gate line of each stage is configured to be loaded with a gate signal of the said stage. For example, an n-th stage gate line is configured to be loaded with an n-th stage gate signal Scan(n), and an (n−1)-th stage gate line is configured to be loaded with an (n−1)-th stage gate signal Scan(n−1). A difference value between a maximum value and a minimum value of the gate signal is determined as a gate voltage difference value. The light emitting control line is configured to be loaded with a light emitting control signal Em. The difference value between a maximum value and a minimum value of the light emitting control signal Em is determined as a light emitting control voltage difference value. At least for one of the refresh rates, the difference value of the gate voltage is different from the difference value of the light emitting control voltage. Here, the pixel drive circuit in FIG. 1 is exemplified to correspond to the n-th gate drive circuit. That is, an output terminal of the n-th gate drive circuit may be electrically connected to the n-th gate line, and further electrically connected to the pixel drive circuit in FIG. 1. Therefore, the output terminal of the n-th-stage gate drive circuit and the n-th-stage gate line input the n-th stage gate signal Scan(n) to a control terminal D of a data writing module 20 as the current stage gate signal. At the same time, an output terminal of the gate drive circuit of the (n−1)-th stage and the gate line of the (n−1)-th stage input the (n−1)-th stage gate signal to a first control terminal A and a second control terminal B of a reset module 10 as the previous stage gate signal Scan(n−1).

In particular, for at least one of the control signals, the voltage difference value (VGH−VGL) corresponding to the second refresh rate is set to be different from the voltage difference value (VGH−VGL) corresponding to the first refresh rate. Based on the above, in this embodiment, the gate voltage difference value may be further set to be different from the light emitting control voltage difference value for at least one of the refresh rates. That is, when the frequency is changed, the gate voltage difference value and the light emitting control voltage difference value may be adjusted by different amplitudes. In particular, refined settings may be provided according to the loading numbers and positions of the gate signal and the light emission control signal in the pixel drive circuit, such that the screen flicker phenomenon due to the refresh rate switching can be further finely improved. Further, in FIGS. 1 and 2, in this embodiment, the below description is described as an example. The gate signal of any stage and the light emitting control signal Em of any stage have a maximum value VGH or a minimum value VGL at any stage, wherein the minimum value VGL may be less than zero, and the minimum value VGL of the gate signal of each stage and the minimum value VGL of the light emitting control signal Em of each stage are at an active level. The minimum value VGL of the gate signal of each stage is generated by being delayed by a time t1 with respect to the minimum value VGL of the previous stage gate signal. Also, it may be understood as the n-th stage gate signal is delayed by a time t1 with respect to the (n−1)-th stage gate signal. As discussed above, it can be understood that associated devices in both the reset module 10 and the data writing module 20 may be in operate during the minimum value VGL stage of the corresponding gate signal.

In an embodiment, the display panel includes a circuit board disposed with a digital power management integrated chip, and a panel disposed with a gate drive circuit, a light emitting control circuit, the plurality of control lines, and the plurality of pixel drive circuits. The gate drive circuit electrically connects the digital power management integrated chip and the pixel drive circuits, and the gate drive circuit generates the gate signal under the control of the digital power management integrated chip. The light emitting control circuit electrically connects the digital power management integrated chip and the pixel drive circuits, and the light emitting control circuit generates the light emitting control signal under the control of the digital power management integrated chip.

In particular, in connection with the above description, among the plurality of control signals, the gate signal and the maximum and minimum values of the gate signal are commonly determined by the digital power management integrated chip and the gate drive circuit, and the maximum and minimum values of the light emitting control signal are commonly determined by the digital power management integrated chip and the light emitting control circuit. Thus, for different refresh rates, the gate signal and the light emitting control signal may be adjusted by adjusting parameters associated with the digital power management integrated chip, the gate drive circuit, and the light emission control circuit, to achieve "for at least one of the control signals, the voltage difference value (VGH−VGL) corresponding to the second refresh rate is different from the voltage difference value (VGH−VGL) corresponding to the first refresh rate".

In one embodiment, as shown in FIGS. 1 and 2, the control lines electrically connected to each of the pixel drive circuits include a gate line of a previous stage configured to be loaded with the gate signal Scan(n−1) of the previous stage, a gate line of a current stage configured to be loaded with the gate signal Scan(n) of the current stage, and a light emitting control line. Each of the pixel drive circuits includes: a reset module 10, wherein a first control terminal A and a second control terminal B of the reset module 10 receive the gate signal Scan(n−1) of the previous stage, and an input terminal C of the reset module 10 receives the reset signal Vinit; a data writing module 20, wherein the control terminal D of the data writing module 20 receives a gate signal Scan(n) of a current stage, and an input terminal E of the data writing module 20 receives a data signal Vdata; a light emitting control module 30, wherein a first control terminal F and a second control terminal G of the light emitting control module 30 receive a light emitting control signal Em, and a third control terminal H of the light emitting control module 30 is electrically connected to a first output terminal I of the reset module 10, an input terminal J of the light emitting control module 30 is electrically connected to an output terminal K of the data writing module 20, and a gate of the drive transistor T1 is set as a third control terminal H of the light emitting control module 30; a light emitting module 40, wherein an input terminal L of the light emitting module 40 is electrically connected to the output terminal M of the light emitting control module 30 and the second output terminal N of the reset module 10; a compensation module 50, wherein a control terminal O of the compensation module 50 receives the current stage gate signal Scan(n), and an output terminal P of the compensation module 50 is electrically connected to the third control terminal H of the light emitting control module 30; and a storage module 60, wherein a first terminal R of the storage module 60 receives a high voltage signal VDD, and a second terminal S of the storage module 60 is electrically connected to the gate of the drive transistor T1.

On the one hand, in connection with the above description, the light emitting control module 30 includes a drive transistor T1. In the pixel drive circuit, the first terminal R of the storage module receives the high voltage signal VDD, and the second terminal S of the storage module is electrically connected to the gate of the drive transistor T1, as shown in FIG. 1. Taking the storage module 60 including a storage capacitor Cst for example, the storage capacitance Cst and the drive transistor T1 are disposed in series. As can be seen from FIG. 2, the absolute value of the total voltage drop $\Delta V1$ of the gate voltage Vg1 of the drive transistor T1 is equal to the absolute value of the change amount of the voltage across the storage capacitor Cst in the light emitting stage t3 of the light emitting module 40. It can be seen from an equation that $q = Cst \times \Delta V1 = Ioff \times \Delta t$, when the capacitance value Cst of the storage capacitor Cst and the current Ioff flowing through the storage capacitor Cst are not considered, the total voltage drop $\Delta V1$ of the gate voltage Vg1 of the drive transistor T1 is related to the light emitting duration $\Delta t$ of the light emitting module 40. The light emitting duration $\Delta t$ of the light emitting module 40 and the refresh rate f of the corresponding one frame image have the following relationship: $\Delta t = 1/f$. In conjunction with the above "$Cst \times \Delta V1 = Ioff \times \Delta t$", it can be seen that $Cst \times \Delta V1 = Ioff/f$. That is, in the light-emitting phase t3 of the light-emitting module 40, the total voltage drop $\Delta V1$ of the gate voltage Vg1 of the drive transistor T is negatively correlated with the refresh rate f of the corresponding one frame image. Further, the input terminal L of the light emitting module 40 is electrically connected to the output terminal M of the light emitting control module 30. Thus, an amplitude value of the voltage across the light emitting control module 30 and an amplitude value of the current flowing through the light emitting control module 30 may impact on the light emitting condition of the light emitting module 40. Therefore, the refresh rate f of the image may impact on the light emitting condition of the light emitting module 40 by impacting on the total voltage drop $\Delta V1$ of the gate voltage Vg1 of the drive transistor T1, so that the screen flicker phenomenon occurs when the refresh rate of the image is switched. In the case where the data signals Vdata are same, regardless of the influence of other factors on the gate voltage Vg1 of the driving transistor T1, the screen flicker phenomenon is degraded when the total voltage drops $\Delta V1$ of the gate voltage Vg1 of the driving transistor T1 are different. To the contrary, the screen flicker phenomenon with the same total voltage drops $\Delta V1$ is not obvious.

On the other hand, in connection with the above description, the first control terminal F and the second control terminal G of the light emitting control module 30 receive the light emitting control signal Em, the third control terminal H of the light emitting control module 30 is electrically connected to the first output terminal I of the reset module 10, and the input terminal J of the light emitting control module 30 are electrically connected to the output terminal K of the data writing module 20. The first control terminal A and the second control terminal B of the reset module 10 receive the previous stage gate signal Scan(n−1). The control terminal D of the data writing module 20 receives the current stage gate signal Scan(n). Therefore, the minimum value VGL of the gate signal of each stage and the minimum value VGL of the light emitting control signal Em of each stage may be directly or indirectly supplied to the light emitting control module 30 through the reset module 10 and the data writing module 20, and thus impact on the magnitude of the voltage across the light emitting control module 30 and the magnitude of the current flowing through the light emitting control module 30. Further, it can be seen from the above description that "the voltage across and the current flowing through the light emitting control module 30 may impact on the light emitting condition of the light emitting module 40", the magnitude of the minimum value VGL of the control signal may impact on the gate voltage of the drive transistor T1 and thus impact on the light emitting condition of the light emitting module 40.

In particular, in conjunction with FIG. 2, in a short period between a time at which the gate voltage Vg1 of the drive transistor T1 can be charged up to drive the light emitting module 40 and the light emitting stage t3, the coupling effect including, but not limited to, coupling effects of the storage capacitor Cst and other capacitors of the pixel drive circuit on the gate of the drive transistor T1, the gate voltage Vg1 of the drive transistor T1 has a positive change amount ΔV2, and drops by a voltage drop at the start time of the light emitting stage t3. ΔV2 can be considered as be equivalent to (VGH−VGL)×Cst/Call, and Call can be considered as the sum of the other capacitors of the pixel drive circuit. Therefore, regardless of Cst and Call, the positive change amount ΔV2 of the gate of the drive transistor T1 is related to both the minimum values VGL and the maximum values VGH of the gate signal and the light emitting control signal Em of each stage.

It will be understood that in the present embodiment, in the first refresh group formed by at least part of refresh rates, the minimum value VGL of the control signal is set to be negatively correlated with the refresh rate. That is, the minimum value of the control signal may vary with the change of the refresh rate. For example, the larger the refresh rate f is, the smaller the minimum value VGL of the control signal is, and the larger the positive change amount ΔV2 presented at the gate voltage Vg1 of the drive transistor T1 will be, so that the larger the gate voltage Vg1 of the driving transistor T1 before the light emitting module 40 emits light is. Similarly, the smaller the refresh rate f is, the larger the minimum value VGL of the control signal is, and the smaller the positive change amount ΔV2 presented in the gate voltage Vg1 of the drive transistor T1 will be, so that the smaller the gate voltage Vg1 of the driving transistor T1 before the light emitting module 40 emits light is. Therefore, in the present embodiment, in contrast to the higher refresh rate, the lower refresh rate can realize that the positive change amount ΔV2 is set to be smaller. That is, the gate voltage Vg1 of the drive transistor T1 is further pulled lower during a period prior to the light emitting stage t3 of the light emitting module 40. Therefore, the duration (that is, the duration of the light emitting stage t3) during which the gate voltage Vg1 of the driving transistor T1 is decreased is increased due to the lower refresh rate f, so that the absolute value of the voltage drop of the gate voltage Vg1 of the driving transistor T1 is increased. Even if the absolute value of the voltage drop of the gate voltage Vg1 of the driving transistor T1 is increased, the value of the total voltage drop ΔV1 at the start time of the light emitting stage t3 is decreased by the smaller positive change amount ΔV2 in the entire light emitting stage t3, so that the total voltage drop ΔV1 in the entire light emitting stage t3 can be effectively avoided to be too large. Therefore, even when the refresh rate is switched from the higher refresh rate to the lower refresh rate, the total voltage drops ΔV1s in the entire light emitting stage t3 may tends to be same, so that the operating currents flowing through the light emitting module 40 also tends to be same and the brightness areas of the light emitting module 40 are same, thereby improving the screen flicker problem. Similarly, in this embodiment, for the higher refresh rate with respect to the lower refresh rate, a value of the total voltage drop ΔV1 at the start time of the light emitting stage t3 can be further increased by the large positive change amount ΔV2 at the same time, so that excessive reduction of the total voltage drop ΔV1 can be effectively prevented. In view of the foregoing, in this embodiment, the minimum value of each of the control signals is correspondingly compensated according to sizes of the refresh rates in the first refresh frequency group, thereby effectively improving the problem that the total voltage drop ΔV1 of the gate voltage Vg1 of the drive transistor T1 is too small when the refresh rate is switched, thereby reducing the screen flicker phenomenon caused by the larger total voltage drop ΔV1 and reducing the display quality of the display panel.

In one embodiment, the refresh rate within the preset refresh rate range is 60 Hz, 90 Hz, or 120 Hz. It can be understood that 60 Hz, 90 Hz and 120 Hz may be used as the three values with relatively high refresh rate probability. That is, the preset refresh rate range in this embodiment may cover the three values with relatively high refresh rate probability, so that when the refresh rate is at least 60 Hz, 90 Hz or 120 Hz, "the minimum value VGL of the control signal is negatively correlated with the refresh rate" may be met. In conjunction with the above description, in this embodiment, the screen flicker phenomenon caused by switching refresh rates between 60 Hz, 90 Hz and 120 Hz may be improved. It avoids recording the minimum value VGL corresponding to each refresh rate value in this embodiment. That is, the screen flicker phenomenon caused by switching refresh rates is improved with a large probability while avoiding excessive memory occupation in this embodiment.

In one embodiment, in the preset refresh rate range, the minimum value VGL of each of the control signals is linearly related to the refresh rate in the first refresh frequency group. In particular, in connection with the above description, it is clear from q=Cst×ΔV1=Ioff×Δt and Δt=1/f that ΔV1=Ioff×Δt/Cst=Ioff/(Cst×f)=k1/f, k1=Ioff/Cst>0. As analyzed above, ΔV1 is negatively correlated with f. It can be understood that in this embodiment, a linear relationship between the minimum value VGL of each of the control signals and the refresh rate is provided. Here, VGL=−m×f is illustrated as an example, m is greater than zero. In combination with ΔV2=(VGH−VGL)×(Cst/Call), ΔV2=(VGH+m×f)×(Cst/Call)=k2×(VGH+m×f) can be realized in this embodiment, wherein k2=Cst/Call>0. In view of the above, ΔV2 may be positively correlated with f in this embodiment. Further, the value of m can be set appropriately according to the preset refresh rate range, to effectively avoid ΔV1 being too large or too small, thereby reducing the screen flicker phenomenon due to the refresh rate switching.

It should be noted that, in the preset refresh rate range in this embodiment, a linear relationship between the minimum value VGL of each of the control signals and the refresh rate is provided. A plurality of minimum values VGL corresponding to a plurality of refresh rates may be determined as basic coordinates under the guarantee of the display effect of the display panel by optical parameters visually observed by the human and measured by an optical probe, and then the minimum value VGL corresponding to other refresh rates within the preset refresh rate range may be determined in combination with a linear interpolation method. In the present embodiment, the efficiency of determining the minimum value VGL corresponding to each refresh rate is improved and the storage space of the display panel is effectively saved.

In one embodiment, the minimum value VGL of each of the control signals and the refresh rate satisfy the equation Va−Vmin=(Vmax−Vmin)(Fa−Fmin)/(Fmax−Fmin), where Fmax means the maximum value of the refresh rate, Fmin means the minimum value of the refresh rate, Vmax means the minimum value of the control signal when the refresh rate is equal to Fmax, Vmin means the minimum value of the control signal when the refresh rate is equal to Fmin, Fa means the refresh rate of the image to be displayed, Va means the minimum value of the control signal when the refresh rate is equal to Fa. In particular, in connection with the above description, a plurality of minimum values VGL corresponding to a plurality of refresh rates may be determined as basic coordinates under the guarantee of the display effect of the display panel by optical parameters visually observed by the human and measured by an optical probe, and then the minimum value VGL corresponding to other refresh rates within the preset refresh rate range may be determined in combination with a linear interpolation method. Further, in this embodiment, the minimum value Vmax of the control signal corresponding to the maximum value Fmax of the refresh rate and the minimum value Vmin of the control signal corresponding to the minimum value Fmin of the refresh rate may be first determined by optical parameters visually observed by the human and measured by an optical probe. Then, the minimum value VGL corresponding to other refresh rates within the preset refresh rate range may be further determined by a linear interpolation method. That is, in the premise of the linear relationship between the minimum value VGL and the refresh rate, two refresh rates farthest away from each other can be selected to determine the basic coordinates. The obtained equation with respect to the minimum value VGL and the refresh rate is reasonable. As described above, in the present embodiment, the increase in the efficiency of determining the minimum value VGL corresponding to each refresh rate is maximized and saving the storage space of the display panel is maximized.

Figure 3:
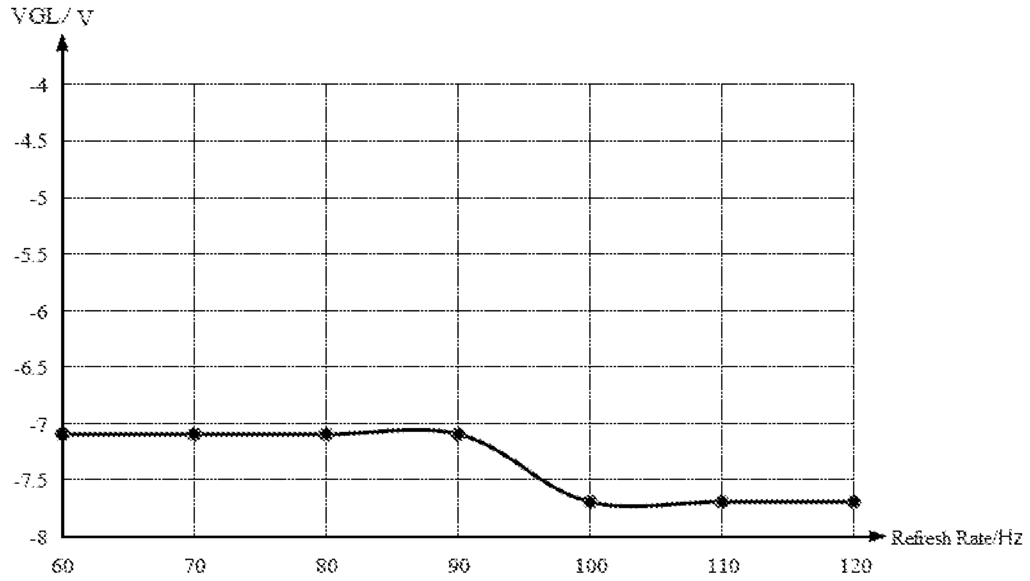
FIG. 3 is a graph of VGL corresponding to a refresh rate in a pixel drive circuit according to an embodiment of the present disclosure.
Figure 4:
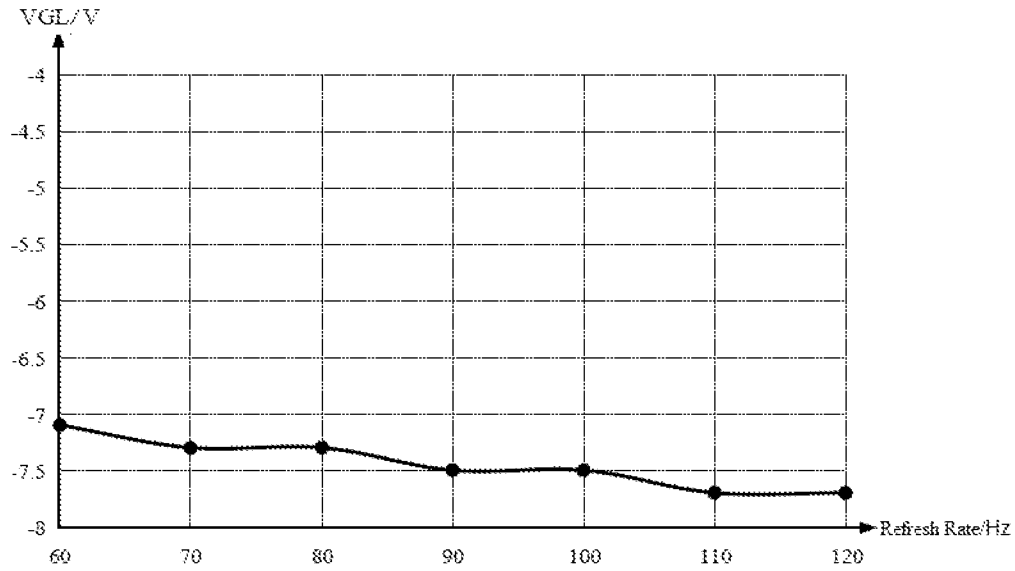
FIG. 4 is a graph of another VGL corresponding to a refresh rate in a pixel drive circuit according to an embodiment of the present disclosure.

In one embodiment, with reference to, but not limited to, FIGS. 3 and 4, the plurality of refresh rates includes a third refresh rate and a fourth refresh rate, which are different from each other, and a voltage difference value corresponding to the third refresh rate is equal to a voltage difference value corresponding to the fourth refresh rate. Further, it can be understood that a second refresh frequency group is consisted of at least the third refresh rate and the fourth refresh rate. That is, the minimum values VGL of the control signals corresponding to respective refresh rates in the second refresh frequency group are identical to each other. Here, the range of the second refresh frequency group is described to be [60 Hz, 120 Hz] as an example.

In the preset refresh rate range, the minimum value VGL is negatively correlated with the refresh rate. That is, in the refresh rate range of [60 Hz, 120 Hz], after the minimum value VGL corresponding to 60 Hz and the minimum value VGL corresponding to 120 Hz are determined, the minimum value VGL corresponding to other refresh rates determined by the mapping rule and the minimum value VGL corresponding to 60 Hz, and the minimum value VGL corresponding to 120 Hz may be stored into the display panel, or only the minimum value VGL of the preset voltage corresponding to 60 Hz and the minimum value VGL corresponding to 120 Hz may be stored into the display panel, and the preset voltage corresponding to the other refresh rate and the minimum value VGL corresponding to 60 Hz are determined by the mapping rule in the display panel.

In particular, as shown in FIG. 3, the minimum value VGL is less than zero, when the minimum value VGL is negatively correlated with the refresh rate, the larger the refresh rate is, the smaller the minimum value VGL is, and the minimum values VGL corresponding to different refresh rates are different from each other. Further, a plurality of minimum values VGL corresponding to, but not limited to, both the maximum value Fmax of the refresh rate and the minimum value Fmin of the refresh rate may be determined as basic coordinates under the guarantee of the display effect of the display panel by optical parameters visually observed by the human and measured by an optical probe. For example, three minimum values VGL respectively corresponding to the refresh rates of 60 Hz, 90 Hz and 120 Hz may be determined as the basic coordinates. Further, preset voltage values corresponding to other refresh rates between 60 Hz and 90 Hz may be determined by the two minimum values VGL respectively corresponding to the refresh rates of 60 Hz and 90 Hz. Similarly, preset voltages corresponding to other refresh rates between 90 Hz and 120 Hz may also be determined by the two minimum values VGL respectively corresponding to the refresh rates of 90 Hz and 120 Hz. Here, the basic coordinates can be reasonably set according to the accuracy requirement of the minimum value VGL.

In the preset refresh rate range, under the condition that the plurality of the minimum values VGL corresponding to a portion of the refresh rates are equal to each other, after the minimum values VGL corresponding to 60 Hz and the minimum values VGL corresponding to 120 Hz are determined, the preset voltages corresponding to a portion of the refresh rates between 60 Hz and 120 Hz may be set equal to each other. Specifically, since the minimum value VGL is less than zero, when the plurality of the minimum values VGL corresponding to a portion of the refresh rates are equal to each other, that is, the refresh rate is larger, the preset voltages corresponding to a portion of the refresh rates located 60 Hz and 120 Hz and close to 60 Hz may be set as the preset voltage corresponding to 60 Hz, and the preset voltages corresponding to a portion of the refresh rates between 60 Hz and 120 Hz and close to 120 Hz may be set as the preset voltage corresponding to 120 Hz. Alternatively, as shown in FIG. 4, three minimum values VGL respectively corresponding to the refresh rates of 60 Hz, 90 Hz and 120 Hz may be determined as the basic coordinates. Similarly, a portion of the preset voltages corresponding to a portion of the refresh rates between 60 Hz and 90 Hz may be set to be equal and between the two minimum values VGL respectively corresponding to 60 Hz and 90 Hz. Alternatively, a portion of the preset voltages corresponding to a portion of the refresh rates between 90 Hz and 120 Hz may be set to be equal and between the two minimum values VGL respectively corresponding to 90 Hz and 120 Hz. The basic coordinates may be properly set here according to the accuracy requirement of the minimum value VGL.

Figure 5:
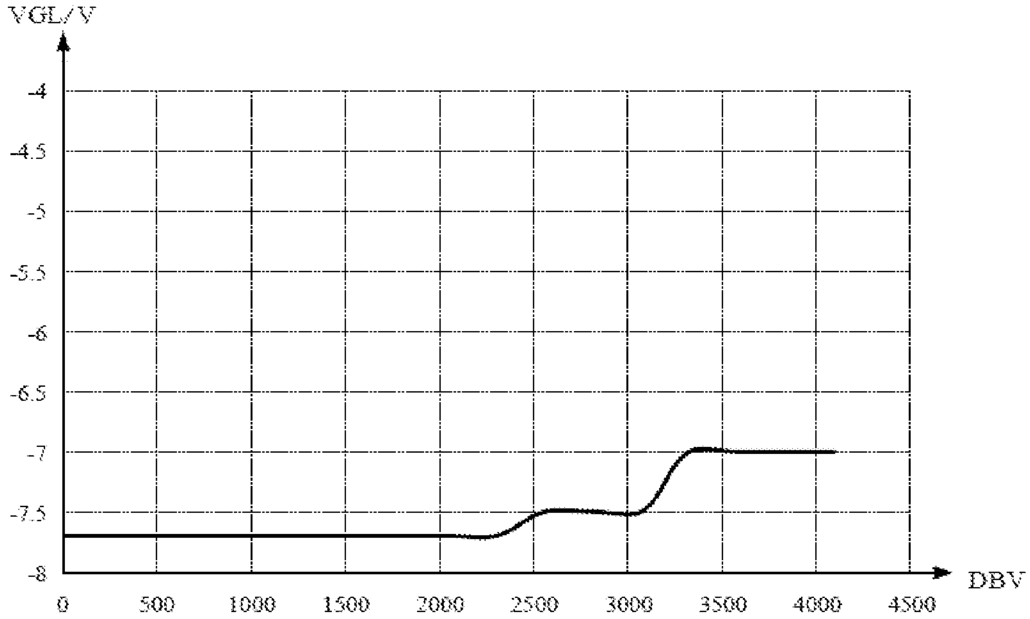
FIG. 5 is graphs corresponding to VGL corresponding to DBV in a pixel drive circuit according to an embodiment of the present disclosure.

In one embodiment, with reference to, but not limited to, FIG. 5, the minimum value VGL of each of the control signals is positively correlated at least with a display brightness in a first display brightness group. In particular, the display brightness in this embodiment may be understood as a value at which a brightness bar in the display panel is located, that is, DBV (display brightness). The larger the value of the brightness bar in the display panel is set, the larger the display brightness in the present embodiment is. At a higher DBV, the larger the minimum value VGL of the corresponding control signal may be.

In connection with the above description, in connection with FIGS. 1 and 2, in the light emitting stage t3 of the light emitting module 40, the gate voltage Vg1 of the drive transistor T1 has a total voltage drop ΔV1. The gate voltage Vg1 of the driving transistor T1 has rised by a positive change amount ΔV2 due to the coupling effect before the light emitting module 40 emits light and drops rapidly by a voltage drop at the start time of the light emitting stage t3. In particular, with reference to the above related description, it can be understood that without considering the refresh rate switching, the larger the positive change amount ΔV2 of the gate voltage Vg1 of the drive transistor T1 is, the larger the start value of the gate voltage Vg1 of the drive transistor T1 in the light emitting stage t3 of the light emitting module 40 is, the larger the average light emitting luminance of the light emitting module 40 in the light emitting stage t3 may be.

In one embodiment, referring to, but not limited to, FIG. 5, any display brightness of the first display brightness group is greater than any display brightness of a second display brightness group. It should be noted that human eyes are more sensitive to different grayscales at low display brightness. Therefore, the minimum value VGL that impacts on the light emitting of the light emitting module 40 may be maintained as a theoretical value at a low display brightness, to reduce the influence on the light emitting of the light emitting module 40 at different grayscales. Since the overall power consumption is not large at this time, the minimum value VGL of each of the control signals may be set smaller, as shown in FIG. 5. Based on the above, the display brightness formed in the second display brightness group in this embodiment may be understood as the above-mentioned "low display brightness". That is, the display brightness formed in the first display brightness group is larger than the above-mentioned "low display brightness". That is, the present embodiment may be understood as in the range of the first display brightness group formed of a plurality of display brightness at which human eye is less sensitive to different grayscales, the minimum value VGL is positively correlated with the average luminous brightness of the luminous module 40. That is, the larger the minimum value VGL is, the larger the average luminous brightness of the luminous module 40 is. On the one hand, since the minimum value VGL is less than zero, VGL is closer to zero when the display brightness is large in the present embodiment, thereby saving the power consumption of the display panel. On the other hand, in combination with ΔV2 equivalent to (VGH−VGL)×(Cst/Call), the smaller the positive change amount ΔV2 in the gate voltage Vg1 of the drive transistor T1 is. That is, without considering the switch of the refresh rate, in an arrange where the display brightness is larger, the transient brightness abrupt amplitude due to the positive change amount ΔV2 of the voltage Vg1 of the gate of the driving transistor T1 may also be effectively reduce in the present embodiment.

In particular, the maximum value of the second display brightness group may be, but is not limited to, 2,000, the minimum value VGL of the control signal may be a fixed value between −8V and −7.5 V for a plurality of display brightness in the second display brightness group. For a plurality of display brightness in the first display brightness group, the minimum value VGL of the control signal may be positively correlated with the display brightness. At this time, the display brightness corresponding to each minimum value VGL may also meet the requirement of the optical parameters visually observed by the human and measured by an optical probe to ensure the display effect of the display panel.

Figure 6:
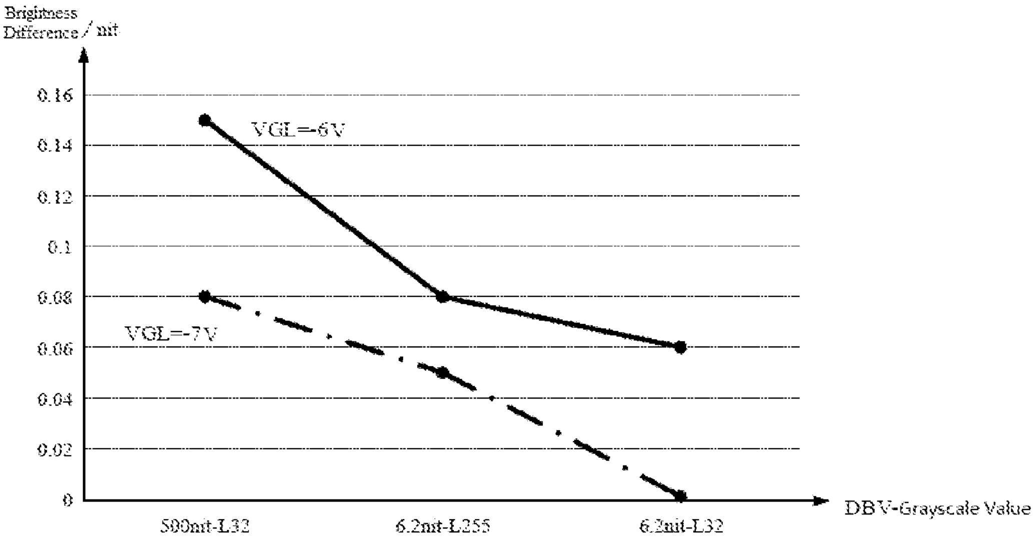
FIG. 6 is a graph of a luminance difference of frequency switching corresponding to a "DBV-grayscale value" group at different VGLs in the pixel drive circuit according to an embodiment of the present disclosure.

In particular, as shown in FIG. 6, the horizontal coordinate represents a display brightness and a grayscale value, and the vertical coordinate represents a change value of a brightness value when the refresh rate is switched with the minimum values VGL of different control signals under the fixed display brightness and grayscale values. 500 nits, 6.2 nits, and the like may respectively represent corresponding two display brightness. It can be understood that, the change value of the brightness value may be selected when the refresh rate is switched from 120 Hz to 60 Hz, at the three display brightness-grayscale values of 500 nits-32 grayscale, 6.2 nits-255 grayscale, and 6.2 nits-32 grayscale, and at the minimum values VGL of −7 V and −6 V, respectively. In particular, it can be seen from FIG. 6 that when the refresh rate is switched from 120 Hz to 60 Hz, the solution in the present disclosure is adopted. That is, the minimum value VGL should be increased. Here, taking the minimum value VGL of −7 V as an example by comparing with the minimum value VGL of −6 V, it is clear that the change values of the brightness values at the three display brightness-grayscale values are all decreased. That is, the curve corresponding to the minimum value VGL of −7 V appears to be located below the curve corresponding to the minimum value VGL of −6 V. It can thus be seen that at least when a higher refresh rate is switched to a lower refresh rate, the minimum value VGL is set to be smaller to be more conducive to improving screen flicker phenomenon.

In an embodiment, referring to, but not limited to, FIG. 1, the reset module 10 includes a first reset transistor T4 and a second reset transistor T7. A gate of the first reset transistor T4 is disposed as a first control terminal A of the reset module 10, and a source of the first reset transistor T4 is disposed as a first output terminal I of the reset module. A gate of the second reset transistor T7 is disposed as a second control terminal B of the reset module 10, and a source of the second reset transistor T7 is disposed as the second output terminal N of the reset module 10. A drain of the first reset transistor T4 and a drain of the second reset transistor T7 are electrically connected to the input terminal C of the reset module. The reset signal Vinit is transmitted through the first reset transistor T4 under the control of the gate signal Scan(n−1) of the previous stage, to reset the light emitting control module 30. The reset signal Vinit is transmitted through the second reset transistor T7 under the control of the gate signal Scan(n−1) of the previous stage, to reset the light emitting module 40.

In particular, as discussed above, the gate of the first reset transistor T4 is disposed as the first control terminal A of the reset module 10 to be loaded with the gate signal Scan(n−1) of the previous stage, and the gate of the second reset transistor T7 is disposed as the second control terminal B of the reset module 10 to be loaded with the gate signal Scan(n−1) of the previous stage. That is, the first reset transistor T4 and the second reset transistor T7 may be controlled to be turned on or not by the gate signal Scan (n−1) of the previous stage. Further, the drain of the first reset transistor T4 and the drain of the second reset transistor T7 are electrically connected to the input terminal C of the reset module to be loaded with the reset signal Vinit. The source of the first reset transistor T4 is disposed to be the first output terminal I of the reset module, to be electrically connected to the third control terminal H of the light emitting module 30, and the source of the second reset transistor T7 is disposed to be the second output terminal N of the reset module, to be electrically connected to the input terminal L of the light emitting module 40. That is, the reset signal Vinit may be controlled by the gate signal Scan(n−1) of the previous stage, to be located to the third control terminal H of the light emitting control module 30 and the input terminal L of the light emitting module 40, when the first reset transistor T4 and the second reset transistor T7 are turned on.

Further, referring to, but not limited to, FIG. 1, a source of the drive transistor T1 is disposed as the input terminal J of the light emitting control module 30, a drain of the drive transistor T1 is electrically connected to an input terminal Q of the compensation module 50. The data writing module 20 includes a data writing transistor T2. A gate of the data writing transistor T2 is disposed as the control terminal D of the data writing module 20, a source of the data writing transistor T2 is disposed as the input terminal E of the data writing module 20, and a drain of the data writing transistor T2 is disposed as the output terminal K of the data writing module 20. The compensation module 50 includes a compensation transistor T3. A gate of the compensation transistor T3 is disposed to the control terminal O of the compensation module 50. A source of the compensation transistor T3 is disposed as the input terminal Q of the compensation module 50 and a drain of the compensation transistor T3 is disposed as the output terminal P of the compensation module 50. The data signal Vdata is controlled by the gate signal Scan(n) of the current stage to be transmitted to the drive transistor T1 through the data writing transistor T2, and the drive transistor T1 is turned on by the compensation transistor T3 is controlled by the gate signal Scan(n) of the current stage, so that the storage module 60 stores the threshold voltage Vth of the drive transistor T1.

In particular, as discussed above, the gate of the data writing transistor T2 is disposed as the control terminal D of the data writing module 20, to be loaded with the gate signal Scan(n) of the current stage, the source of the data writing transistor T2 is disposed as the input terminal E of the data writing module 20, to be loaded with the data signal Vdata, and the drain of the data writing transistor T2 is disposed as the output terminal K of the data writing module 20, to be electrically connected to the input terminal J of the light emitting control module 30. That is, the gate signal Scan(n) of the current stage may control whether the data writing transistor T2 is turned on to transfer the data signal Vdata to the source of the drive transistor T1. Further, the gate of the compensation transistor T3 is disposed as the control terminal O of the compensation module 50, to be loaded with the gate signal Scan(n) of the current stage, the source of the compensation transistor T3 is disposed as the input terminal Q of the compensation module 50, to be electrically connected to the drain of the drive transistor T1, the drain of the compensation transistor T3 is disposed as the output terminal P of the compensation module 50, to be electrically connected to the gate of the drive transistor T1, and the second terminal S of the storage module 60 is electrically connected to the gate of the drive transistor T1. That is, the gate signal Scan(n) of the current stage may control whether the drive transistor T1 is turned on through the compensating transistor T3, to store the potential in the drive transistor T1 including the threshold voltage Vth of the drive transistor T1 to the storage module 60.

Further, referring to, but not limited to, FIG. 1, the light emitting control module 30 further includes a first light emitting control transistor T5 and a second light emitting control transistor T6. A gate of the first light emitting control transistor T5 is disposed as the first control terminal F of the light emitting control module 30, a source of the first light emitting control transistor T5 is loaded with the high voltage signal VDD, a drain of the first light emitting control transistor T5 is electrically connected to the source of the drive transistor T1. A gate of the second light emitting control transistor T6 is disposed as the second control terminal G of the light emitting control module 30, a source of the second light emitting control transistor T6 is electrically connected to the drain of the drive transistor T1, and a drain of the second light emitting control transistor T6 is disposed as an output terminal M of the light emitting control module, to be electrically connected to the input terminal L of the light emitting module 40. The output terminal T of the light emitting module 40 is loaded with a low voltage signal VSS, and a current path is formed between the high voltage signal VDD and the low voltage signal VSS under the control of the light emitting control signal Em, so that a driving current is generated by the drive transistor T1 under the control of the storage module 60, to be transmitted to the light emitting module 40.

In particular, as discussed above, the gate of the first light emitting control transistor T5 is disposed as the first control terminal F of the light emitting control module 30, to be loaded with the light emitting control signal Em. The gate of the second light emitting control transistor T6 is disposed as the second control terminal G of the light emitting control module 30, to be loaded with the light emitting control signal Em, and the source of the first light emitting control transistor T5 is loaded with the high voltage signal VDD, the drain of the first light emitting control transistor T5 is electrically connected to the source of the drive transistor T1, a source of the second light emitting control transistor T6 is electrically connected to the drain of the drive transistor T1, and the drain of the second light emitting control transistor T6 is disposed as the output terminal M of the light emitting control module, to be electrically connected to the input terminal L of the light emitting module 40. That is, the light emitting control signal Em may control the first light emitting control transistor T5 and the second light emitting control transistor T6 are turned on or not, to form a current path between the high voltage signal VDD and the low voltage signal VSS, so that the driving current is generated by the drive transistor T1 under the control of the storage module 60, to be transmitted to the light emitting module 40 for driving the light emitting module 40 to emit light.

Thereafter, the pixel drive circuit described above is an 7T1C structure, each of the transistors is a P-type transistor, and the light emitting module 40 is taken as an OLED for an example. Three stages in the operation of the pixel drive circuit will be described with reference to FIGS. 1 and 2. The pixel drive circuit in the present disclosure is not limited to the 7T1C structure. Each of the transistors is also not limited to a P-type transistor. For example, each of the transistors may also be an N-type transistor.

In the reset stage T1, the gate signal Scan(n−1) of the previous stage is the minimum value VGL. That is, it works for P-type transistors, and the gate of the first reset transistor T4 and the gate of the second reset transistor T7 are located with the minimum value VGL, so that both the first reset transistor T4 and the second reset transistor T7 are turned on. Thus, the reset signal Vinit may be configured to reset the gate of the drive transistor T1 through the first reset transistor T4, and to reset the input terminal L of the light emitting module 40 through the second reset transistor T7. That is, both the potential of the first reset transistor T4 to the gate of the drive transistor T1 and the potential of the second reset transistor T7 to the input terminal L of the light emitting module 40 are Vinit.

In particular, no suitable voltage difference is formed between an anode terminal and a cathode terminal of the OLED at this time. That is, the OLED is in a turn-off state. Both the source and the drain of the drive transistor T1 are floated. That is, the operation state of the drive transistor T1 is unknown, but the data in the previous frame may be prevented from remaining on the gate of the drive transistor T1 and the anode terminal of the OLED to impact on the data in the current frame.

In the compensation and write stage t2, the gate signal Scan(n) of the current stage has the minimum value VGL. That is, it works for P-type transistors, and the gate of the data writing transistor T2 and the gate of the compensation transistor T3 are loaded with the minimum value VGL, so that both the data writing transistor T2 and the compensation transistor T3 are turned on. Thus, the data signal Vdata may be transmitted to the source of the drive transistor T1 through the data writing transistor T2, so that the drive transistor T1 is turned on. The compensation transistor T3 is electrically connected to the gate and the drain of the drive transistor T1.

In particular, both a drain voltage and the gate voltage of the drive transistor T1 are Vdata−|Vth|, where Vth means the threshold voltage of the drive transistor T1, the voltage of the second terminal S of the storage capacitor Cst is also equal to Vdata−|Vth|. Since both the gate of the first reset transistor T4 and the second reset transistor T7 are turned off, a drain voltage of the first reset transistor T4 is Vinit. That is, a drain-source voltage of the first reset transistor T4 is Vdata−|Vth_M4-Vinit, and a drain-source voltage of the second reset transistor T7 is a turn-on voltage drop of the second reset transistor T7.

In the light emitting stage t3, the light emitting control signal Em has the minimum value VGL. That is, it works for P-type transistors, and the gate of the first light emitting control transistor T5 and the gate of the second light emitting control transistor T6 are loaded with the minimum value VGL, so that both the first light emitting control transistor T5 and the second light emitting control transistor T6 are turned on. Thus, the high voltage signal VDD may be transmitted to the source of the drive transistor T1 through the first light emitting control transistor T5, so that the drive transistor T1 continues to be turned on. The second light emitting control transistor T6 is electrically connected to the drain of the drive transistor T1 and the anode terminal of the OLED. That is, the current path between the high voltage signal VDD and the low voltage signal VSS is turned on, and the driving current generated by the drive transistor T1 is transmitted to the OLED through the current path between the high voltage signal VDD and the low voltage signal VSS, to drive the OLED to emit light.

In particular, due to the storage capacitor Cst, the source of the first reset transistor T4, the drain of the compensation transistor T3 and the gate voltage Vg1 of the driving transistor T1 are all Vdata−|Vth|, and the voltage at the drain of the first reset transistor T4 is Vinit. That is, the drain-source voltage of the first reset transistor T4 is still Vdata−|Vth_M4|-Vinit. Meanwhile, a source voltage of the compensation transistor T3 is VSS+Voled, where Voled is the turn-on voltage drop of OLED. That is, a drain-source voltage of the compensation transistor T3 is Vdata−|Vth|−(ELVSS+Voled). A source-gate voltage of the drive transistor T1 is VDD−(Vdata−|Vth|). Further, the driving current for driving the OLED to emit light is $\frac{1}{2}\times\mu\times Cgi\times(W/L)\times(Vsg1-|Vth|)^2$, where p means the carrier mobility of the drive transistor T1, Cgi means capacitance between the gate and the channel of the drive transistor T1, (W/L) means the width-to-length ratio of the drive transistor T1, and Vsg1 means the source-gate voltage of the drive transistor T1. As discussed above, Vsg1 is VDD−(Vdata−|Vth|). Thus, the driving current for driving the OLED to emit light is $\frac{1}{2}\times\mu\times Cgi\times(W/L)\times(VDD-Vdata)^2$. Since the driving current is independent of the threshold voltage of the drive transistor T1, it can reduce the risk of brightness unevenness due to the difference in threshold voltages of different drive transistors T1.

It should be noted that when a plurality of sub-pixels in the pixel drive circuit are scanned row by row through the multi-stage of gate lines to emit light. When any frame image display is performed, after sub-pixels in a first row emit light under the control of the corresponding pixel drive circuits, the light emitting state is maintained until a next frame image is displayed by performing the corresponding light emission after the reset. In connection with the above description, in the light emitting stage t3 of the light emitting module 40 corresponding to a sub-pixel in any row, the gate voltage Vg1 of the drive transistor T1 has a total voltage drop ΔV1, and the total voltage drop ΔV1 of the gate voltage Vg1 of the drive transistor T1 is negatively correlated with the refresh rate f of the corresponding frame image. When the gate voltage Vg1 of the drive transistor T1 rises due to the action of the compensation transistor T3 in the compensation and write stage t2, the coupling effect including but not limited to a coupling effect of the storage capacitor Cst and other capacitors in the pixel drive circuit on the gate of the drive transistor T1, makes the gate voltage Vg1 of the drive transistor T1 have the positive change amount ΔV2. The positive change amount ΔV2 of the gate of the drive transistor T1 is related to both the minimum value VGL and the maximum value VGH of the gate signal and the light emitting control signal Em of each stage.

Further, in conjunction with the description "the driving current for driving the OLED to emit light is $\frac{1}{2}\times\mu\times Cgi\times(W/L)\times(Vsg1-|Vth|)^2$", it can be seen that in the light emitting stage t3, the driving current for driving the OLED to emit light is related to a source-gate voltage Vsg1 of the drive transistor T1. The driving current for driving the OLED to emit light the source voltage Vs1 of the drive transistor T1 is equal to the magnitude of the high voltage signal VDD. That is, in contrast to at the lower refresh rate, and the total voltage drop ΔV1 of the gate voltage Vg1 of the drive transistor T1 at the higher refresh rate is smaller due to the smaller duration of the light emitting stage t3. In combination with the source-gate voltage Vsg1=Vs1−Vg1=VDD−Vg1 of the drive transistor T1, in contrast to at the lower refresh rate, the higher refresh rate is, the smaller the source-gate voltage Vsg1 of the drive transistor T1 is. That is, the smaller the driving current for driving the OLED to emit light is.

Based on the above, in the present disclosure, the minimum value VGL of the control signal is disposed to be negatively correlated with the refresh rate within the preset refresh rate range formed by at least a part of the refresh rates. That is, when the higher refresh rate is compared with the lower refresh rate, the larger the minimum value VGL is disposed in the present disclosure, the smaller the positive change amount ΔV2 presented at the gate voltage Vg1 of the drive transistor T1 is, so that the value of the total voltage drop ΔV1 at the start time of the light emitting stage t3 is also pulled down by the smaller positive change amount ΔV2, thereby effectively reducing the total voltage drop ΔV1. Thus, the driving current for driving the OLED to emit light is avoided from being larger as the total voltage drop ΔV1 is excessively large in the entire light emitting stage t3, so that the difference in light emitting brightness of the OLED is larger when the higher refresh rate is switched to the lower refresh rate. Therefore, in the present disclosure, the difference between the driving current for driving the OLED to emit light at the higher refresh rate and the driving current for driving the OLED to emit light at the lower refresh rate is reduced, thereby improving the screen flicker problem due to the refresh rate switching, and improving the display quality of the display panel.

Embodiments of the present disclosure provide a display device including, but not limited to, any display panel as described above.

The present disclosure provides a display panel and a display device, the display panel including: a plurality of control lines configured to be loaded with a plurality of control signals, wherein a difference value between a maximum value and a minimum value of the control signal is determined as a voltage difference value; a plurality of pixel drive circuits, wherein each of the plurality of pixel drive circuits is electrically connected to more than one of the control lines, wherein each of the pixel drive circuits includes a drive transistor and a light emitting element electrically connected to the drive transistor; wherein the display panel has a plurality of refresh rates, the plurality of refresh rates include a first refresh rate and a second refresh rate greater than the first refresh rate, and wherein for at least one of the control signals, the voltage difference value corresponding to the second refresh rate is different from the voltage difference value corresponding to the first refresh rate. In the present disclosure, the voltage difference value corresponding to the larger second refresh rate is different from the voltage difference value corresponding to the smaller first refresh rate. That is, the minimum value of each of the control signals is correspondingly compensated according to the magnitude of the refresh rate, so as to increase or decrease a value of a gate voltage of the drive transistor at a start period of a light emitting period of the light emitting element, so as to reduce a difference value between total voltage drops ΔV1 of gate voltages of the drive transistor T1 due to the switch of the refresh rate, thereby reducing the screen flicker phenomenon due to the larger total voltage drop ΔV1.

The display panel and the display device according to embodiments of the present disclosure are described in detail above. The principles and implementations of the present disclosure are described herein by adopting specific examples. The description of the above embodiments is only used to help understand the technical solutions and core ideas of the present disclosure. It should be understood by those of ordinary skill in the art that it may still modify the technical solutions described in the foregoing embodiments, or equivalently substitute some of the technical features thereof; These modifications or substitutions do not make the corresponding technical solution detached from the scope of the technical solutions of the embodiments of the present disclosure.

What is claimed is:

1. A display panel comprising:

a plurality of control lines configured to be loaded with a plurality of control signals, wherein a difference value between a maximum value and a minimum value of each of the plurality of control signals is determined as a voltage difference value; and a plurality of pixel drive circuits, wherein each of the plurality of pixel drive circuits is electrically connected to more than one control lines of the plurality of control lines, and wherein each of the plurality of pixel drive circuits comprises a drive transistor and a light emitting element electrically connected to the drive transistor;

wherein the display panel has a plurality of refresh rates, and the plurality of refresh rates comprises a first refresh rate and a second refresh rate greater than the first refresh rate, and wherein for at least one control signal of the plurality of control signals, the voltage difference value corresponding to the second refresh rate is different from the voltage difference value corresponding to the first refresh rate, wherein for at least one control signal of the plurality of control signals, the minimum value of the at least one control signal is disposed to be negatively correlated with the refresh rate within a preset refresh frequency group comprising the first refresh rate and the second refresh rate, to decrease a voltage value of a gate voltage of the drive transistor at a start point of the light emitting element at the first refresh rate, or to increase the voltage value of the gate voltage of the drive transistor at the start point of the light emitting element at the second refresh rate, and wherein the first refresh rate and the second refresh rate are switched at a same grayscale value.

2. The display panel according to claim 1, wherein for at least one control signal of the plurality of control signals, the voltage difference value corresponding to the second refresh rate is greater than the voltage difference value corresponding to the first refresh rate.

3. The display panel according to claim 2, wherein for at least one control signal of the plurality of control signals, the minimum value of the at least one control signal corresponding to the second refresh rate is less than the minimum value of the at least one control signal corresponding to the first refresh rate.

4. The display panel according to claim 1, wherein the minimum value of at least one control signal of the plurality of control signals and the refresh rate satisfy the following equation:

$$Va-V\text{min}=(V\text{max}-V\text{min})(Fa-F\text{min})/(F\text{max}-F\text{min});$$

wherein Fmax means a maximum value of the refresh rate, Fmin means a minimum value of the refresh rate, Vmax means the minimum value of the at least one control signal when the refresh rate is equal to Fmax, Vmin means the minimum value of the at least one control signal when the refresh rate is equal to Fmin, Fa means a refresh rate of an image to be displayed, and Va means the minimum value of the at least one control signal when the refresh rate is equal to Fa.

5. The display panel according to claim 1, wherein the plurality of refresh rates comprise a third refresh rate and a fourth refresh rate different from each other, and the voltage difference value corresponding to the third refresh rate is equal to the voltage difference value corresponding to the fourth refresh rate.

6. The display panel according to claim 1, wherein the plurality of refresh rates comprises 60 Hz, 90 Hz and 120 Hz.

7. The display panel according to claim 1, wherein the plurality of control lines comprises:

plural stages of gate lines, wherein the gate line of each stage is configured to be loaded with a gate signal of the stage, and a difference value between a maximum value and a minimum value of the gate signal is determined as a gate voltage difference value; and light emitting control lines, wherein each of the light emitting control lines is configured to be loaded with a light emitting control signal, wherein a difference value between a maximum value and a minimum value of the light emitting control signal is determined as light emitting control voltage difference value;

wherein at least for one of the plurality of refresh rates, the gate voltage difference value is different from the light emitting control voltage difference value.

8. The display panel according to claim 7, wherein the display panel comprises:

a circuit board disposed with a digital power management integrated chip;

a panel disposed with gate drive circuits, a light emitting control circuit, the plurality of control lines, and the plurality of pixel drive circuits; and wherein the gate drive circuits electrically connect the digital power management integrated chip and the plurality of pixel drive circuits, and each of the gate drive circuits generates the gate signal under the control of the digital power management integrated chip; and wherein the light emitting control circuit electrically connects the digital power management integrated chip and the plurality of pixel drive circuits, and the light emitting control circuit generates the light emitting control signals under the control of the digital power management integrated chip.

9. The display panel according to claim 7, wherein each of the plurality of pixel drive circuits comprises:

a first reset transistor and a second reset transistor, wherein a gate of the first reset transistor and a gate of the second reset transistor are loaded with a gate signal of a previous stage, a drain of the first reset transistor and a drain of the second reset transistor are loaded with a reset signal, a source of the first reset transistor is electrically connected to a gate of the drive transistor, a source of the second reset transistor is electrically connected to a first terminal of the light emitting element, the reset signal is transmitted through the first reset transistor under the control of the gate signal of the previous stage to reset the gate of the drive transistor, and the reset signal is transmitted through the second reset transistor under the control of the gate signal of the previous stage, to reset the first terminal of the light emitting element;

a data writing transistor, wherein a gate of the data writing transistor is loaded with a gate signal of a current stage, a source of the data writing transistor is loaded with a data signal, a drain of the data writing transistor is electrically connected to a source of the drive transistor, and the data signal is controlled by the gate signal of the current stage to be transmitted to the source of the drive transistor through the data writing transistor;

a compensation transistor, wherein a gate of the compensation transistor is loaded with the gate signal of the current stage, a source of the compensation transistor is electrically connected to a drain of the drive transistor, a drain of the compensation transistor is electrically connected to the gate of the drive transistor, and the gate and the source of the drive transistor is turned on by the compensation transistor under the control of the gate signal of the current stage;

a storage capacitor configured to store a threshold voltage of the drive transistor, wherein a first terminal of the storage capacitor is loaded with a high voltage signal, and a second terminal of the storage capacitor is electrically connected to the gate of the drive transistor; and a first light emitting control transistor and a second light emitting control transistor, wherein a gate of the first light emitting control transistor and a gate of the second light emitting control transistor are loaded with the light emitting control signal, a source of the first light emitting control transistor is loaded with the high voltage signal, a drain of the first light emitting control transistor is electrically connected to the source of the drive transistor, and a source of the second light emitting control transistor is electrically connected to the drain of the drive transistor, a drain of the second light emitting control transistor is electrically connected to the first terminal of the light emitting element, a second terminal of the light emitting element is loaded with a low voltage signal, and a current path is formed between the high voltage signal and the low voltage signal under the control of the light emitting control signal, such that a driving current is generated by the drive transistor under the control of the storage module, to be transmitted to the light emitting element.

10. The display panel according to claim 1, wherein a capacitor is formed between the control line and a gate of the drive transistor.

11. The display panel according to claim 1, wherein the minimum value of each of the plurality of control signals is at least positively correlated with a display brightness in a first display brightness group.

12. The display panel according to claim 11, wherein any display luminance in the first display luminance group is greater than any display luminance in a second display luminance group.

13. The display panel according to claim 1, wherein, gate voltages of the drive transistor at least at the first refresh rate and the second refresh rate have the same change amount during a light emitting stage of the light emitting element.

14. A display panel comprising:

a plurality of control lines configured to be loaded with a plurality of control signals, wherein a difference value between a maximum value and a minimum value of each of the plurality of control signals is determined as a voltage difference value; and a plurality of pixel drive circuits, wherein each of the plurality of pixel drive circuits is electrically connected to more than one control lines of the plurality of control lines and comprises a drive transistor and a light emitting element electrically connected to the drive transistor;

wherein gate voltages of the drive transistor at least at two different refresh rates of the plurality of refresh rates have the same change amount during a light emitting stage of the light emitting element, wherein the display panel has a plurality of refresh rates, and the plurality of refresh rates comprises a first refresh rate and a second refresh rate greater than the first refresh rate, wherein for at least one control signal of the plurality of control signals, the minimum value of the at least one control signal is disposed to be negatively correlated with the refresh rate within a preset refresh frequency group comprising the first refresh rate and the second refresh rate, to decrease a voltage value of a gate voltage of the drive transistor at a start point of the light emitting element at the first refresh rate, or to increase the voltage value of the gate voltage of the drive transistor at the start point of the light emitting element at the second refresh rate, and wherein the first refresh rate and the second refresh rate are switched at a same grayscale value.

15. The display panel according to claim 14, wherein for at least one control signal of the plurality of control signals, the voltage difference value corresponding to the second refresh rate is different from the voltage difference value corresponding to the first refresh rate.

16. The display panel according to claim 15, wherein for at least one control signal of the plurality of control signals, the minimum value of the at least one control signal corresponding to the second refresh rate is less than the minimum value of the at least one control signal corresponding to the first refresh rate.

17. The display panel according to claim 16, wherein the minimum value of each of the plurality of control signals is at least negatively correlated with a refresh rate in a first refresh frequency group.

18. The display panel according to claim 14, wherein more than one control lines of the plurality of control lines electrically connected to each of the plurality of pixel drive circuits comprises a gate line of a previous stage configured to be loaded with a gate signal of the previous stage, a gate line of a current stage configured to be loaded with a gate signal of the current stage, and a light emitting control line, and each of the plurality of pixel drive circuits comprises:

a reset module, wherein a first control terminal and a second control terminal of the reset module are loaded with the gate signal of the previous stage, an input terminal of the reset module is loaded with a reset signal;

a data writing module, wherein a control terminal of the data writing module is loaded with the gate signal of the current stage, and an input terminal of the data writing module is loaded with a data signal;

a light emitting control module, wherein a first control terminal and a second control terminal of the light emitting control module are loaded with a light emitting control signal, a third control terminal of the light emitting control module is electrically connected to a first output terminal of the reset module, an input terminal of the light emitting control module is electrically connected to an output terminal of the data writing module, and a gate of the drive transistor is disposed as the third control terminal of the light emitting control module;

a light emitting module, wherein a first terminal of the light emitting module is electrically connected to an output terminal of the light emitting control module and a second output terminal of the reset module;

a compensation module, wherein a control terminal of the compensation module is loaded with the gate signal of the current stage, and an output terminal of the compensation module is electrically connected to the third control terminal of the light emitting control module; and a storage module, wherein a first terminal of the storage module is loaded with a high voltage signal, and a second terminal of the storage module is electrically connected to the gate of the drive transistor.

19. A display device comprising the display panel according to claim 1.

20. The display device according to claim 19, wherein for at least one control signal of the plurality of control signals, the voltage difference value corresponding to the second refresh rate is greater than the voltage difference value corresponding to the first refresh rate.

* * * * *